(12) United States Patent
Sakazume et al.

(10) Patent No.: US 6,538,558 B2
(45) Date of Patent: Mar. 25, 2003

(54) COMMUNICATION SYSTEM

(75) Inventors: Tatsumi Sakazume, Saitama-ken (JP); Suguru Asakura, Saitama-ken (JP); Noboru Seki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 08/933,694

(22) Filed: Sep. 19, 1997

(65) Prior Publication Data

US 2001/0002813 A1 Jun. 7, 2001

(30) Foreign Application Priority Data

Sep. 20, 1996 (JP) ............................................. 8-250425

(51) Int. Cl.7 .............................................. G05B 19/00
(52) U.S. Cl. ..................................................... 340/5.23
(58) Field of Search ........................... 340/825.31, 426, 340/825.22, 5.22, 5.23; 70/278; 307/10.1

(56) References Cited

U.S. PATENT DOCUMENTS

| | | | |
|---|---|---|---|
| 4,750,118 A | * 6/1988 | Heitschel | 340/825.31 |
| 4,791,280 A | * 12/1988 | O'Connell | 340/825.31 |
| 5,055,658 A | * 10/1991 | Cockburn | 340/825.31 |
| 5,406,274 A | 4/1995 | Lambropoulos et al. | |
| 5,412,378 A | * 5/1995 | Clemens | 340/825.31 |
| 5,635,916 A | * 6/1997 | Bucholtz | 340/825.31 |
| 5,648,764 A | 7/1997 | Nose et al. | |

FOREIGN PATENT DOCUMENTS

| | | | | |
|---|---|---|---|---|
| GB | 2144249 | * | 2/1985 | ............ 340/825.31 |
| JP | Hei-71337 | | 7/1995 | |
| JP | 7-71337 | | 7/1995 | |
| JP | 8-51680 | | 2/1996 | |

* cited by examiner

Primary Examiner—Brian Zimmerman
(74) Attorney, Agent, or Firm—Brinks Hofer Gilson & Lione

(57) ABSTRACT

A communication system capable of preventing a lost transmitter from being used by an unauthorized user for a bad purpose, and also capable of easily enabling the lost transmitter to be used again when it is found. The communication system comprises: a transmitter for transmitting a transmission code containing at least an identification code uniquely assigned to the transmitter; and a receiver comprising: an identification code memory capable of storing a received identification code; a signal processing unit which compares the received identification code with an identification code stored in the identification code memory and outputs a control signal to a part to be controlled if the comparison shows that both the identification codes are identical to each other; and a mode controller for switching the operation mode of the signal processing unit from a normal mode to a control signal disable mode wherein in the normal mode the control signal is allowed to be output whereas the control signal is prohibited to be output in the control signal disable mode.

25 Claims, 10 Drawing Sheets

COMMUNICATION SYSTEM

BACKGROUND OF THE INVENTION

1. Field of the Invention

The present invention relates to a communication system, and more particularly, to a communication system comprising one or more remote control transmitters and a single receiver disposed inside a mobile body such as a car wherein in response to reception of various kinds of switching information transmitted from a remote control transmitter, the receiver selectively controls a controllable device provided in the mobile body such as a car, depending on the kind of switching information received.

2. Description of the Related Art

A keyless entry system is a communication system which comprise one or more remote control transmitters and a single receiver disposed inside a mobile body such as a car wherein in response to reception of various kinds of switching information transmitted from a remote control transmitter, the receiver selectively controls a controllable device provided in the mobile body such as a car, depending on the kind of switching information received.

FIG. 5 is a simplified block diagram illustrating an example of such a keyless entry system disclosed in Japanese Examined Patent Publication No. 7-71337.

As shown in FIG. 5, this keyless entry system includes three, remote control transmitters 41-1, 41-2, and 41-3 and a single receiver 42 disposed inside a car.

The three remote control transmitters 41-1 through 41-3 each include: a transmitting circuit 43-1, 43-2, or 43-3 for generating a transmission signal; an identification data memory (ROM) 44-1, 44-2, or 44-3 for storing identification data R-1, R-2, or R-3 uniquely assigned to the respective transmitters 41-1, 41-2, and 41-3; and a transmitting antenna 45-1, 45-2, or 45-3.

The receiver 42 includes: a receiving circuit 47 for receiving a signal via a receiving antenna 46, amplifying the received signal, and further shaping the waveform of the amplified signal; a signal processing unit 48 for performing various control operations in various operation modes; a memory (EEPROM) 49 for storing the identification data R-1, R-2, and R-3; a setting switch circuit 50 including two switches 50-1 and 50-2 for setting the operation mode of the signal processing unit 48 to either a normal mode, writing mode, or an erasing mode depending on the on/off states of the switches 50-1 and 50-2; a door controller 51 for locking and unlocking the doors of the car; an indicator/alarm 52 including light emitting diodes and a horn, which operates when the operation mode is switched from the writing mode or the erasing mode to the normal mode; and a timer 53 provided in the signal processing unit 48.

The operation of the keyless entry system having the above construction is briefly described below.

First, the signal processing unit 48 in the receiver 42 is set in the normal mode. That is, the two switches 50-1 and 50-2 of the setting switch circuit 50 in the receiver 42 are both maintained in open states.

In this situation, if one of the three remote control transmitters 41-1, 41-2, 41-3, for example the remote control transmitter 41-1 is operated, the transmitting circuit 43-1 of the remote control transmitter 41-1 generates a control signal (FSK signal) containing a command of locking or unlocking a door of the car and also containing the identification data R-1 read from the identification data memory 44-1. The generated control signal is transmitted via the transmitting antenna 45-1 as a transmission signal at a radio frequency (RF).

In the receiver 42, the receiving circuit 47 receives via the receiving antenna 46 the transmission signal transmitted from the remote control transmitter 41-1. The received control signal is amplified and waveform-shaped, and then supplied to the signal processing unit 48. The signal processing unit 48 first compares the identification data R-1 contained in the received control signal with the identification data R-1 stored in the memory 49. If these data are identical, the signal processing unit 48 then detects the status of the door of the car via the door controller 51. If the door is in a locked state, then the signal processing 48 supplies a control signal to the door so as to unlock the door. On the other hand, if the door is in an unlocked state, then the signal processing unit 46 supplies a control signal to the door so as to lock the door.

When it is required to write identification data R-1, R-2, or R-3 into the memory 49, the switch 50-1 of the setting switch circuit 50 of the receiver 42 is closed by operator while maintaining the other switch 50-2 in the open state, so the operation mode of the signal processing unit 48 of the receiver 42 is set to the writing mode. And the timer 53 is started.

Immediately after setting the operation mode into the writing mode, if one of the three remote control transmitters 41-1, 41-2, 41-3, for example the remote control transmitter 41-1, is operated, a control signal containing the identification data R-1 read from the identification data memory 44-1 is generated by the transmitting circuit 43-1 of the remote control transmitter 41-1 and is transmitted as a transmission signal via the transmitting antenna 45-1. If the receiving circuit 47 of the receiver 4 receives the above control signal from the remote control transmitter 41-1, the receiving circuit 47 transfers the received control signal to the signal processing unit 48. The signal processing unit 48 detects the identification data R-1 from the control signal, and supplies the detected identification data R-1 to the memory 49 so that the identification data R-1 is written into the memory 49. If the count t of the timer 53 has reached a specified value T, for example 5 sec, the indicator/alarm 52 is activated for a short period of time to indicate that the operation mode will be switched, and then the operation mode of the signal processing unit 48 is automatically switched from the writing mode to the normal mode.

When it is required to erase all the identification data R-1, R-2, R-3 stored in the memory 49, only the switch 50-1 of the setting switch circuit 50 of the receiver 42 is first closed by operator while maintaining the other switch in the open state, and the timer 53 is started, and immediately after that, the switch 50-2 of the setting switch circuit 50 is also closed. So the operation mode of the signal processing unit 48 of the receiver 42 is set to the erasing mode.

If the switches 50-1 and 50-2 are set in the above-described manner, all the identification data R-1, R-2, R-3 stored in the memory 49 are erased. After completion of the erasing of the identification data R-1, R-2, R-3, the indicator/alarm 52 is activated for a short time so as to indicate that the contents of the memory 49 have been erased. Then the operation mode of the signal processing unit 48 automatically returns from the erasing mode to the normal mode.

The memory 49 has a plurality of (k) memory areas, so that a plurality of identification data R can be stored in these memory areas. The respective identification data R are stored in the memory 49 in such a manner that one identification data is stored in one memory area and another identification data is stored in another memory area. If k+1 or more identification data R are written, the oldest identification data R is replaced by the newest identification data R each time identification data is input.

In the conventional keyless entry system, when one of remote control transmitters 41-1, 41-2, 41-3 is lost, it is possible to erase all the identification data R-1, R-2, R-3, which are uniquely assigned to the respective remote control transmitters including the lost one, from the memory 49 of the receiver 42. This allows the keyless entry system to be excellent in security.

A basic and important requirement for the keyless entry system is that when any one of the plurality of remote control transmitters 41-1, 41-2, 41-3, for example the remote control transmitter 41-1, is lost, use of the lost remote control transmitter 41-1 can be disabled.

In the conventional keyless entry system described above, if some remote control transmitter is lost, the plurality of identification data R-1, R-2, R-3 are written in the memory 49 so that identification data are all replaced by new identification data thereby erasing the identification data R-1 assigned to the lost remote control transmitter 41-1, or all the identification data R-1, R-2, R-3 stored in the memory 49 are simply erased at the same time thereby erasing the identification data R-1 assigned to the lost remote control transmitter 41-1.

Either one of the two methods may be selected by closing the switch 50-1 of the setting switch circuit 50 of the receiver 42 or operating the switches 50-1 and 50-2 according to the predefined procedure.

However, in the conventional keyless entry system described above, to erase the identification data R-1 assigned to the lost remote control transmitter 41-1 from the memory 49, it is required to erase not only the identification data R-1 but also all the other identification data R-2 and R-3 assigned to the remaining remote control transmitters 41-2 and 41-3 by means of overwriting, because it is impossible to know which identification data is stored in which memory area of the memory 49.

After erasing the identification data R-1 assigned to the lost remote control transmitter 41-1 from the memory 49, if the lost remote control transmitter 41-1 is found somewhere, it is required to write again the identification data R-1 for the remote control transmitter 41-1 into the memory 49 to enable the use of the remote control transmitter 41-1.

However, in the conventional keyless entry system described above, when such the identification data R-1 which has been erased once is written again, it is required to rewrite all identification data R-1, R-2, R-3 for all the remote control transmitters 41-1, 41-2, and 41-3 including the remote control transmitter 41-1, although the identification data which is really required to be written is only the identification data R-1 for the remote control transmitter 41-1. Furthermore, in the conventional keyless entry system described above, if all the identification data R-1, R-2, and R-3 for the remote control transmitters 41-1, 41-2, and 41-3 are simply erased at the same time from the memory 49, it is also required to write the identification data R-1, R-2, and R-3 for all the remote control transmitters 41-1, 41-2, and 41-3 including the remote control transmitter 41-1.

As can be understood from the above description, the conventional keyless entry system has the following problems. After disabling the use of the remote control transmitter 41-1 lost, if this remote control transmitter 41-1 is found, it is required to rewrite the identification data R-1, R-2, and R-3 for all the remote control transmitters 41-1, 41-2, and 41-3 so as to enable the use of the remote control transmitter 41-1 found. However, such the rewriting process is troublesome and time-consuming.

Furthermore, the above keyless entry system needs a special setting switch circuit 50, which results in an increase in cost. Still furthermore, an unauthorized user of the car can easily operate the keyless entry system if he/she knows how to operate the setting switch circuit 50. For example, if identification data is erased with by an unauthorized person, when an authorized user of the car operates his/her remote control transmitter, the receiver 42 will not accept the control signal transmitted from his/her remote control transmitter, and therefore he/she cannot control the devices or utilities of the car. This can occur because the operation is generally common to all cars, and thus many people know how to operate the setting switch circuit 50. Furthermore, to switch the operation mode to the erasing mode, it is required to perform a further procedure in addition to the procedure of setting the operation mode to the writing mode. This causes the total operation to become complicated.

To solve the above problems, the object of the present invention is to provide a communication device capable of preventing a lost transmitter from being used by an unauthorized person and also capable of easily enabling the lost transmitter to be used again via a simple operation when the lost transmitter is found.

SUMMARY OF THE INVENTION

According to an aspect of the present invention, to achieve the above object, there is provided a communication system provided with a mode controller for switching the operation mode of a signal processing unit in a receiver from a normal mode to a control signal disable mode wherein outputting of a control signal is disabled in the control signal disable mode whereas a control signal is allowed to be output in the normal mode.

With this technique, when some remote control transmitter is lost, it is possible to disable use of the lost transmitter by switching the operation mode of the signal processing unit of the receiver from the normal mode to the control signal disable mode thereby preventing the lost transmitter from being used for a bad purpose.

Furthermore, to achieve the object described above, the communication system according to the present invention preferably includes mode setting means for selecting an operation mode depending on whether a transmission code is received or not within a predetermined period of time after a particular operation procedure.

This technique allows a user to easily switch the operation mode of the signal processing unit from the normal mode to the identification code writing mode, from the normal mode to the control signal disable mode, or from the control signal disable mode to the normal mode by performing almost the same operation procedure with a slight difference depending on the operation mode. Thus, the user can easily memorize the operation procedure. Furthermore, when the lost transmitter is found, it is possible to enable the transmitter to be used by performing a simple operation.

DESCRIPTION OF THE PREFERRED EMBODIMENTS

Figure 1:
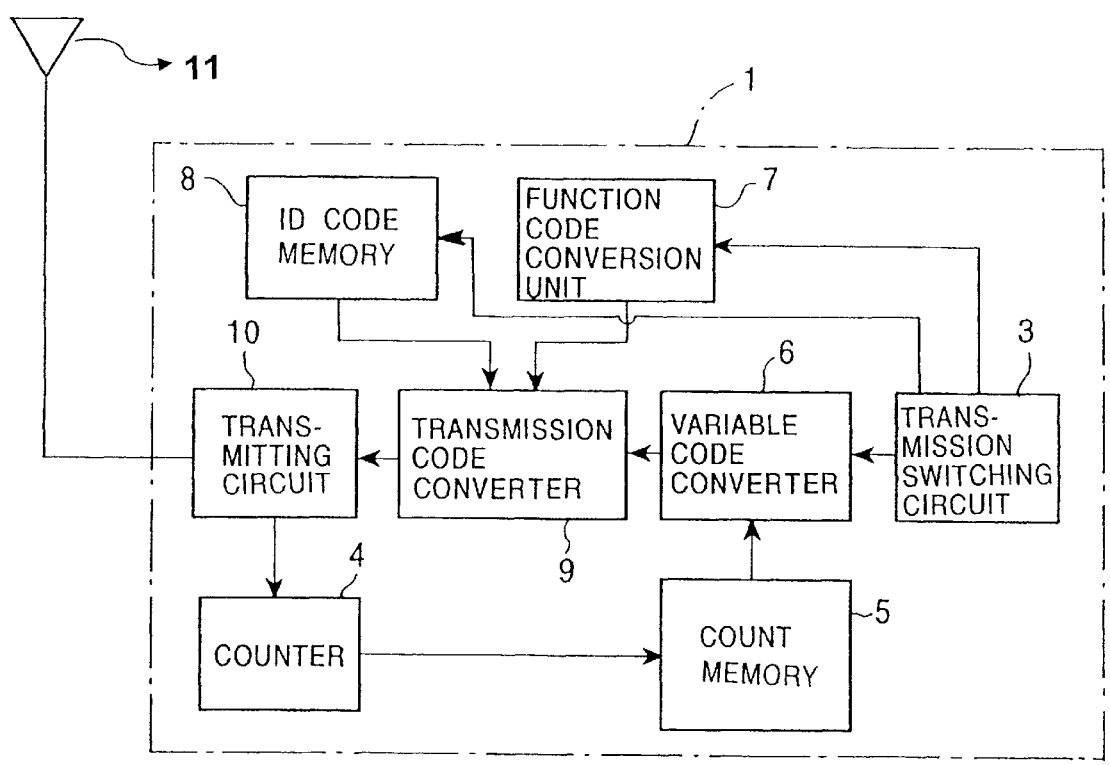
FIG. 1 is a block diagram illustrating an embodiment of a remote control transmitter in a communication system according to the present invention.

According to one mode of the present invention, there is provided a communication system comprising: a transmitter for transmitting a transmission code including at least an identification code uniquely assigned to the transmitter; and a receiver comprising: a memory capable of storing a received identification code; a signal processing unit for comparing the received identification code with an identification code stored in the memory, and, if the comparison shows that they are identical, generating a control signal to a part to be controlled; and a mode controller for switching the operation mode of the signal processing unit from a normal mode in which the signal processing unit is enabled to output a control signal to a control signal disable mode in which the signal processing unit is disabled to output a control signal.

According to another mode of the present invention, there is provided a communication system comprising: a transmitter for transmitting a transmission code including at least an identification code uniquely assigned to the transmitter; and a receiver comprising: a memory capable of writing a received identification code; and a signal processing unit capable of switching its operation mode between a normal mode and an identification code writing mode wherein in the normal mode the signal processing unit compares a received identification code with an identification code stored in the memory, and if the comparison shows that they are identical, the signal processing unit generates a control signal to a part to be controlled, whereas in the identification code writing mode the signal processing unit writes a received identification code into the memory, wherein the signal processing unit has at least a third operation mode in addition to the normal mode and the identification code writing mode, and the signal processing unit includes mode setting means for automatically switching the operation mode from the normal mode to either the identification code writing mode or the third operation mode depending on whether a transmission code is received or not within a predetermined period of time after a particular operation procedure.

Preferably, in this embodiment, the third mode is a control signal disable mode in which the signal processing unit outputs no control signal to a part to be controlled.

Furthermore, the particular operation procedure described above is preferably a procedure of a combination of operations associated with a received transmission code and information supplied from the outside.

The information supplied from the outside is preferably information generated by operating an ignition key of a car.

Preferable, the receiver includes a timer and the predetermined period of time described above is a period from the time when the timer starts at the end of the particular operation procedure to the time when the timer expires or a predetermined signal change occurs in the information supplied from the outside.

In the first mode of the invention, when some remote control transmitter is lost, it is possible to disable use of the lost transmitter by means of switching the operation mode of the signal processing unit of the receiver from the normal mode to the control signal disable mode thereby preventing the lost transmitter from being used for a bad purpose. Furthermore, it is possible to prevent an unauthorized user from mischievously switching the operation mode to the control signal disable mode.

In the second mode of the invention, the operation mode of the signal processing unit is switched by the mode controller according to almost the same procedure in either case of switching from the normal mode to the identification code writing mode or switching from the identification code writing mode to the normal mode, whereas there are slight differences in the operation procedure depending on the operation mode to be switched. Thus, a user can easily memorize the operation mode, and can perform the operation procedure without making a mistake.

Furthermore, when a lost transmitter is found, it is possible to easily release the operation mode from the control signal disable mode thereby enabling use of the transmitter again.

The present invention will be described in further detail below with reference to specific embodiments in conjunction with the accompanying drawings.

Figure 2:
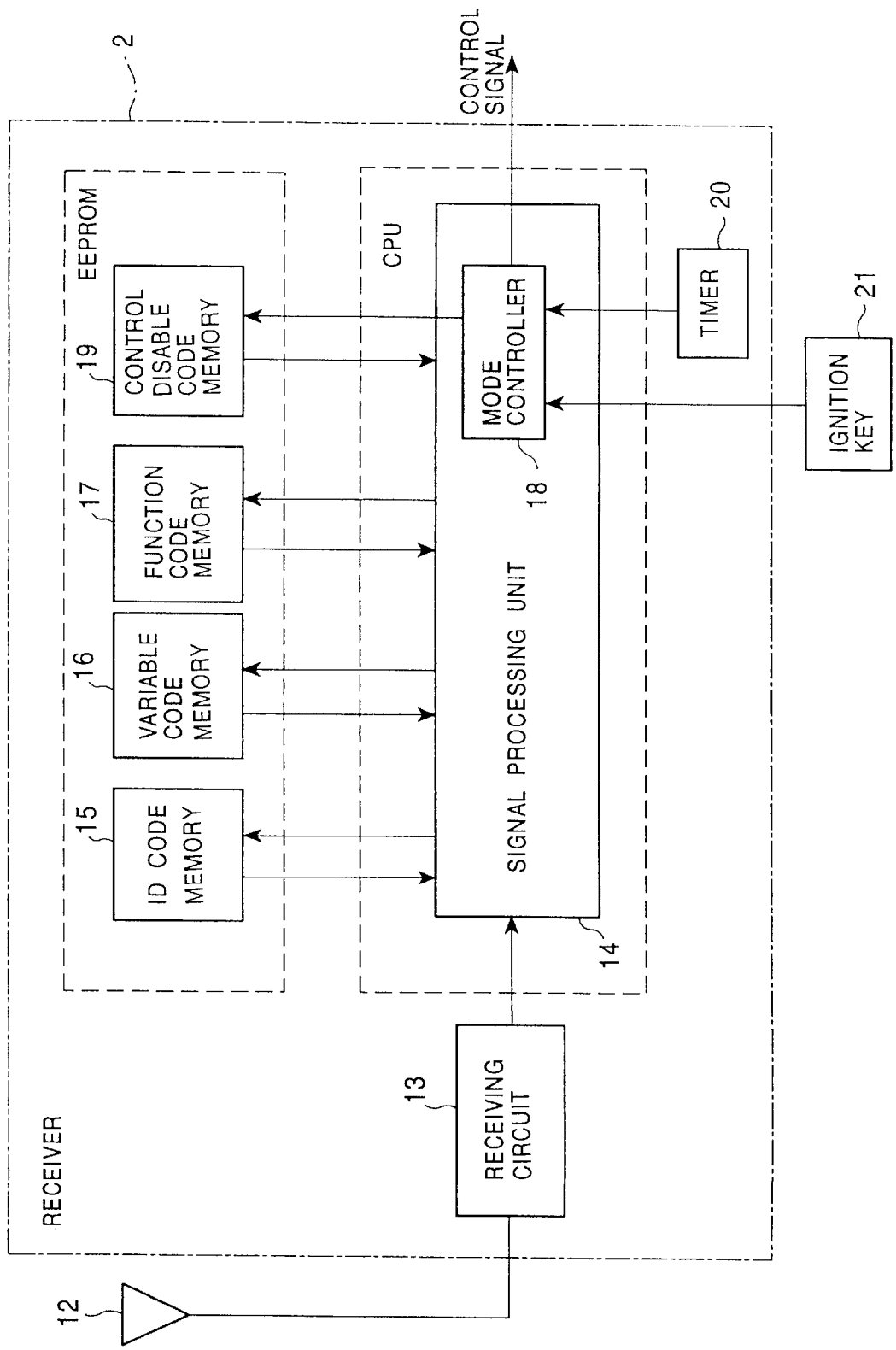
FIG. 2 is a block diagram illustrating an embodiment of a receiver in the communication system according to the present invention.

FIG. 1 is a block diagram illustrating a transmitter of a communication system serving as a keyless entry system according to an embodiment of the present invention, and FIG. 2 is a block diagram illustrating an embodiment of a receiver in the communication system.

In the present embodiment, as shown in FIGS. 1 and 2, the keyless entry system includes at least one remote control transmitter 1 (all transmitters are constructed in a similar manner whereas only one remote control transmitter is shown in FIG. 1), and a single receiver 2 disposed inside a car.

The remote control transmitter 1 includes a transmission switching circuit 3, a counter 4, a count memory 5, a variable code converter 6, a function code converter 7, an identification code memory 8, a transmission code converter 9, a transmitting circuit 10, and a transmitting antenna 11, wherein these elements are connected as shown in FIG. 1.

The transmission switching circuit 3 generates various kinds of switching information for controlling a part of the car to be controlled. For example, locking/unlocking of a door and opening/closing of a trunk are performed in response to the switching information. The counter 4 counts the transmitting operation performed by a transmitting circuit 10 which will be described later. The count memory 5 stores the value counted by the counter 4. The variable code converter 6 reads the count value from the count memory 5 each time the variable code converter 6 receives switching information from the transmission switching circuit 3, and generates a numerical code which varies depending on the count value. The function code converter 7 converts the switching information received from the transmission switching circuit 3 to a function code corresponding to the content of the information. The identification code memory 8 stores an identification code uniquely assigned to the remote control transmitter 1. The transmission code converter 9 generates a transmission code consisting of a start code, fixed code, identification code, function code, variable code, and end code. The transmitting circuit 10 converts the transmission code generated by the transmission code converter 9 to a transmission signal and transmits the resultant transmission signal via the transmitting antenna 11.

The fixed code is for example a code for representing the type of the car and/or its manufacturer. The identification code is uniquely assigned to the transmitter 1. The function codes are for example codes uniquely assigned to the door locking operation and the door unlocking operation, respectively. The variable code is updated each time a transmitting or receiving operation is performed.

The receiver 2 includes a receiving antenna 12, a receiving circuit 13, a signal processing unit 14, an identification code memory 15, a variable code memory 16, a function code memory 17, a mode controller 18, and a control disable code memory 19 wherein these elements are connected as shown in FIG. 2. The signal processing unit 14 and the mode controller 18 form a central processing unit (CPU). The identification code memory 15, the variable code memory 16, the function code memory 17, and the control disable code memory 19 form an electrically erasable/programable read only memory (EEPROM).

In the receiver 2, the receiving circuit 13 receives a transmission signal detected by the receiving antenna 12 and reproduces a transmission code from the received transmission signal. The signal processing unit 14 compares the identification code contained in the transmission code with the identification code stored in the identification code memory and also compares the variable code (numerical code) contained in the transmission code with the variable code (numerical code) stored in the variable code memory 16. If the comparison shows that these codes are identical within a particular range, the signal processing unit 14 then compares the function code contained in the transmission code with function codes stored in the function code memory 17, and supplies a control signal corresponding to the function code to a part to be controlled (not shown) of the car. The mode controller 18 is connected to the timer 20 and also to the ignition key 21 of the car. As will be described in detail later, when the input signal applied to the mode controller 18 satisfies a particular condition, the mode controller 18 sets the operation mode of the signal processing unit 14 to either the normal mode, the identification writing mode, or the control signal disable mode depending on the input signal. The sequence of operations described above is performed when the operation is in the normal mode. In the normal mode, the signal processing unit 14 generates a control signal corresponding to the function code to the part to be controlled (not shown) of the car, whereas when the operation mode is set to the identification code writing mode, the signal processing unit 14 writes the identification code contained in the transmission code into the identification code memory 15. If a control disable code generated by the mode controller 18 is written into the control disable code memory 19, the control disable code memory 19 switches the operation mode of the signal processing unit 14 to the control signal disable mode in which no control signals are allowed to be output.

In the keyless entry system shown in FIGS. 1 and 2, when the signal processing unit 14 is in the normal mode, the operation is performed as follows.

In the remote control transmitter 1, if a certain switch, for example a switch for controlling the operation of the door, in the transmission switching circuit 3 is operated, the switching information is supplied to the variable code converter 6 and the function code converter 7. The variable code converter 6 generates a numerical (variable) code which corresponds to the updated count value read from the count memory and which is different from the previously-output numerical code. The generated numerical code is supplied to the transmission code converter 9. The numerical code generated by the variable code converter 6 in accordance with the updated count value may be changed either in accordance with a particular numerical rule or in a random fashion. The function code converter 7 generates a function code, for example a door locking/unlocking command code, corresponding to the received switching information, and supplies the generated function code to the transmission code converter 9. At the same time, the identification code memory 8 outputs the identification code uniquely assigned to the remote control transmitter 1 and supplies it to the transmission code converter 9. The transmission code converter 9 combines a start code and an end code with the received identification code, function code, and numerical (variable) code thereby generating a transmission code. The resultant transmission code is supplied to the transmitting circuit 10. The transmitting circuit 10 modulates the received transmission code to a radio frequency (RF) signal, and transmits it as a transmission signal via the transmitting antenna 11.

In response to the switching information supplied to the counter 4, the counter 4 reads the previous count value stored in the count memory 5, and increments the count value by 1. The counter 4 replaces the count value stored in the count memory by the incremented value.

In the receiver 2, if the receiving circuit 13 receives the transmission signal from the remote control transmitter 1 via the receiving antenna 12, the receiving circuit 13 reproduces a transmission code from the received transmission signal, and further performs amplification and waveform-shaping on the reproduced code. The resultant code is supplied to the signal processing unit 14. The signal processing unit 14 compares the identification code contained in the received transmission code with the identification code stored in the identification code memory 15. If they are identical, the signal processing unit 14 further compares the numerical (variable) code contained in the received transmission code with the numerical (variable) code stored in the variable code memory 16. If they are identical within a particular range, the signal processing unit 14 then compares the function code contained in the received transmission code with various function codes stored in the function code memory 17. If some function code stored in the function code memory 17 is found to be identical to the received function code, the signal processing unit 14 generates a control signal such as a door locking/unlocking command signal in accordance with the function code, and supplies the generated control signal to a door controller (not shown). In response, the door of the car is unlocked if it is in a locked state, whereas the door is locked if it is in an unlocked state. In any operation mode, the variable code contained in the transmission code is stored in the variable code memory 16.

When the signal processing unit 14 makes comparison of the identification code, the numerical (variable) code, and the function code, if it is concluded that any of these codes is not identical or is not within the allowable range, the process is terminated.

Figure 3:
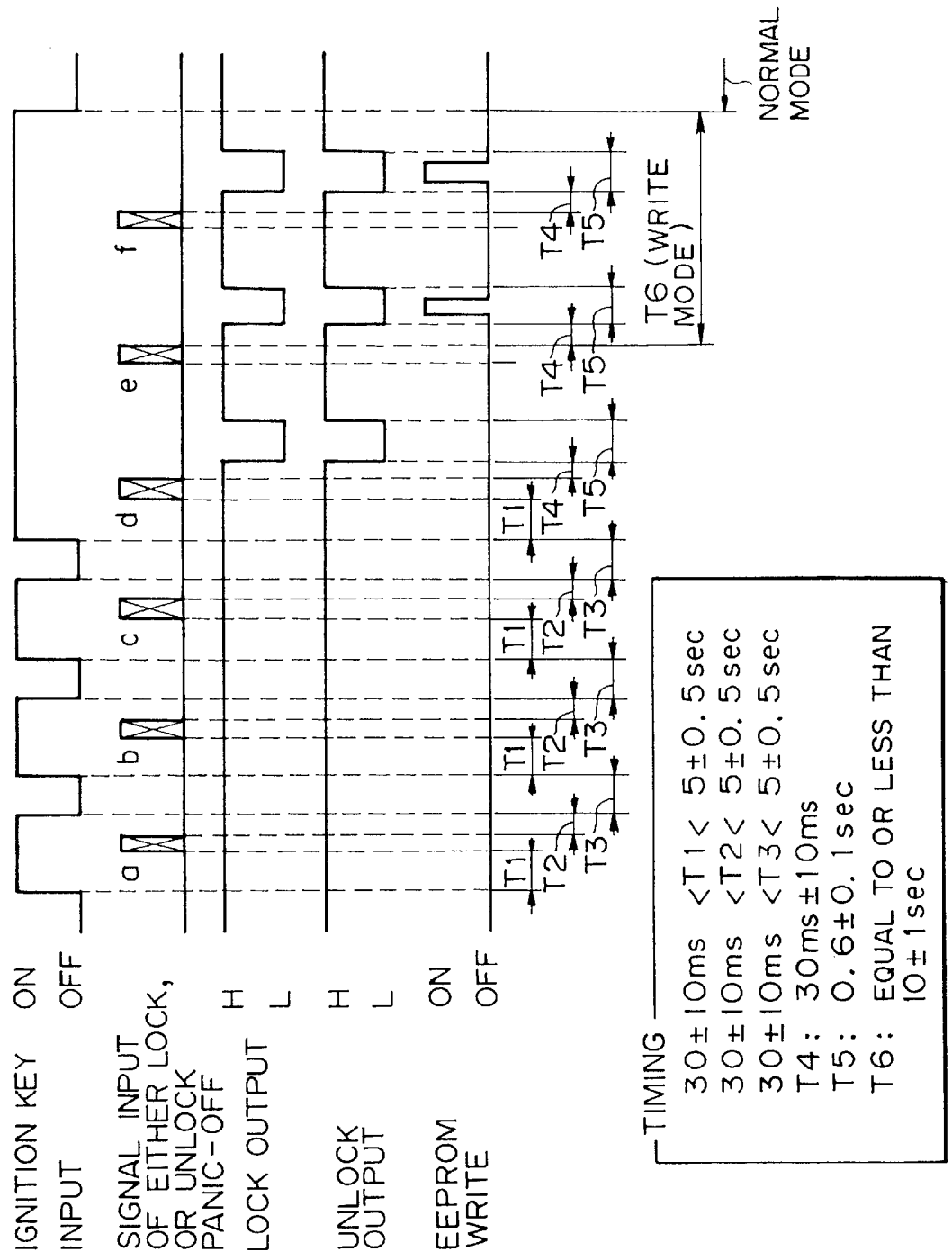
FIG. 3 is a timing chart associated with the operation of setting the operation mode of the signal processing unit of the receiver shown in FIG. 2 to an identification code writing mode.

In the keyless entry system according to the present embodiment, when the signal processing unit 14 is in the identification code writing mode, an identification code is written into the identification code memory 15 for example in the manner which will be described below with reference to FIG. 3.

In the keyless entry system of the present embodiment, if the operation mode is switched from the normal mode to the identification code writing mode in response to a transmission code and particular information supplied from the outside, an identification code can be written as will be described below, wherein such an operation is performed for example when one of a plurality of remote control transmitters 1 is lost, and thus it is required to rewrite the unique identification codes for the remaining remote control transmitters 1 other than the lost remote control transmitter into the identification code memory 15 of the receiver 2.

The switching of the operation mode of the signal processing unit 14 from the normal mode to the identification code writing mode is performed as follows.

First, the ignition key 21 of the car is turned from the accessory (ACC) position (denoted by "OFF" in FIG. 3) to the ON position (denoted by "ON" in FIG. 3) thereby supplying an ON signal to the mode controller 18. In a time period in which the ON signal is still supplied, when a time T1 has elapsed from the start of the ON signal, if either the LOCK, UNLOCK, or PANIC-OFF switch of the transmission switch circuit 3 of any of the remaining transmitters 1 is operated, a transmission code containing an identification code is generated in response to the above switching operation and is transmitted from the remote control transmitter 1. In the receiver 2, the identification code (denoted by "a" in FIG. 3) contained in the received transmission code is supplied to the mode controller 18. Within a time T2 after the supply of the identification code was stopped, the ignition key 21 is turned from the ON position to the ACC position so as to stop the supply of the ON signal. Thus, the process returns into the starting state and the first operation cycle is completed.

Within a time T3 after the supply of the ON signal was stopped at the end of the first operation cycle, the ignition key 21 is turned again from the ACC position to the ON position thereby supplying an ON signal to the mode controller 18. Within a time T1 after the start of the ON signal when the ON signal is still supplied, the same switch of the transmission switch circuit 3 of the remote control transmitter 1 as the switch operated in the first operation cycle is operated. In response, an identification code (denoted by "b" in FIG. 3) is generated and transmitted from the remote control transmitter 1. In the receiver 2, a received function code is supplied to the mode controller 18. Within a time T2 after the supply of the identification code was stopped, the ignition key 21 is turned from the ON position to the ACC position so as to stop the supply of the ON signal. Thus, the process returns into the starting state and the second operation cycle is completed.

Within a time T3 after the supply of the ON signal was stopped at the end of the second operation cycle, if the ignition key 21 is turned again from the ACC position to the ON position thereby supplying an ON signal to the mode controller 18, a third operation cycle starts. This third operation cycle is performed in the same manner as the first and second operation cycle, and is completed when the ignition key 21 is turned from the ON position to the ACC position thereby stopping the supply of the ON signal. Thus, the process returns to the starting state.

Within a time T3 after the supply of the ON signal was stopped at the end of the third operation cycle, if the ignition key 21 is turned again from the ACC position to the ON position thereby supplying an ON signal to the mode controller 18, a fourth operation cycle starts. A part of the fourth operation cycles, from the start of the ON signal until the received identification code is supplied to the mode controller 18 in the receiver within a time T1, is performed in the same manner as the first through third operation cycles. However, when a time T4 has elapsed after the supply of the identification code was stopped, the operation mode of the signal processing unit 14 is set to the mode setting state. In the mode setting state, the mode controller 18 activates the signal processing unit 14 and makes the signal processing unit 14 sequentially generate a door lock control signal and a door unlock control signal within a time T5 so as to operate the lock key of the door thereby notifying a user that the signal processing unit 14 has been set in a mode setting state. In the previous operation cycles, the identification codes a through c shown in FIG. 3 are all identical to one another, that is, they are all transmitted from the same single remote control transmitter 1.

Within a time T6 after the transition into the mode setting state, a first one of the remaining remote control transmitters 1 is operated in such a manner as to transmit a transmission code containing a first identification code to be written into the identification code memory 15. When the receiver 2 receives the transmission code, if the transmission code and the ON signal from the ignition key 21 are supplied to the mode control 18 at the same time, the mode controller 18 sets the signal processing unit 14 into the identification code writing mode. When a time T4 has elapsed after the supply of the transmission code was stopped, the mode controller 18 activates the signal processing unit 14 so that the first identification code contained in the transmission code is supplied from the signal processing unit to the identification code memory 15 thereby writing the first identification code into the identification code memory 15. At the same time, the mode controller 18 makes the signal processing unit 14 sequentially output a door lock control signal and a door unlock control signal within a time T5 so as to operate the lock key of the door thereby notifying the user that the identification code has been written in the identification code memory 15.

After the output of the door lock control signal and the door unlock control signal from the signal processing unit 14 is stopped, a second one of the remaining remote control transmitter 1 is operated so that it transmits a transmission code containing a second identification code to be written into the identification code memory 15. When the receiver 2 receives this transmission code, if this transmission code and the ON signal from the ignition key 21 are supplied to the mode controller 18 at the same time, the mode controller 18 activates the signal processing unit 14 after a time T4 has elapsed from the end of the ON signal so that the second identification code contained in the transmission code is supplied from the signal processing unit to the identification code memory 15 thereby writing the second identification code in the identification code memory 15. At the same time, the mode controller 18 makes the signal processing unit 14 sequentially output a door lock control signal and a door unlock control signal within a time T5 so as to operate the lock key of the door thereby notifying the user that the second identification code has been written in the identification code memory 15.

Furthermore, a third identification code of a third one of the remaining remote control transmitters 1 may be written into the identification code memory 15 in the same manner as the previous two identification codes. When the writing operation is completed, the lock key of the door is operated so that the user can know the completion of the writing operation.

It is required that the above operation of writing the identification codes should be completed within a time T6 after the operation mode of the signal processing unit 14 has been set into the mode setting state, or within a period from the ON-to-ACC transition of the ignition key 21 to the end of the ON signal. As long as the operation is performed within this period T6, it is possible to write not only two identification codes as is the case in FIG. 3 but three or more identification codes.

At the end of this time period, the operation mode of the signal processing unit 14 returns to the normal mode under the control of the mode controller 18.

In the above sequence of operation steps, the times T1, T2, and T3 are each selected to 30±10 msec to 5±0.5 sec, T4 is selected to 30±10 msec, T5 is selected to 0.6±0.1 sec, and T6 is selected to 10±1 sec, although these values may be modified as required. The elapse of these times T1 through T6 is counted by the timer 20.

Figure 4:
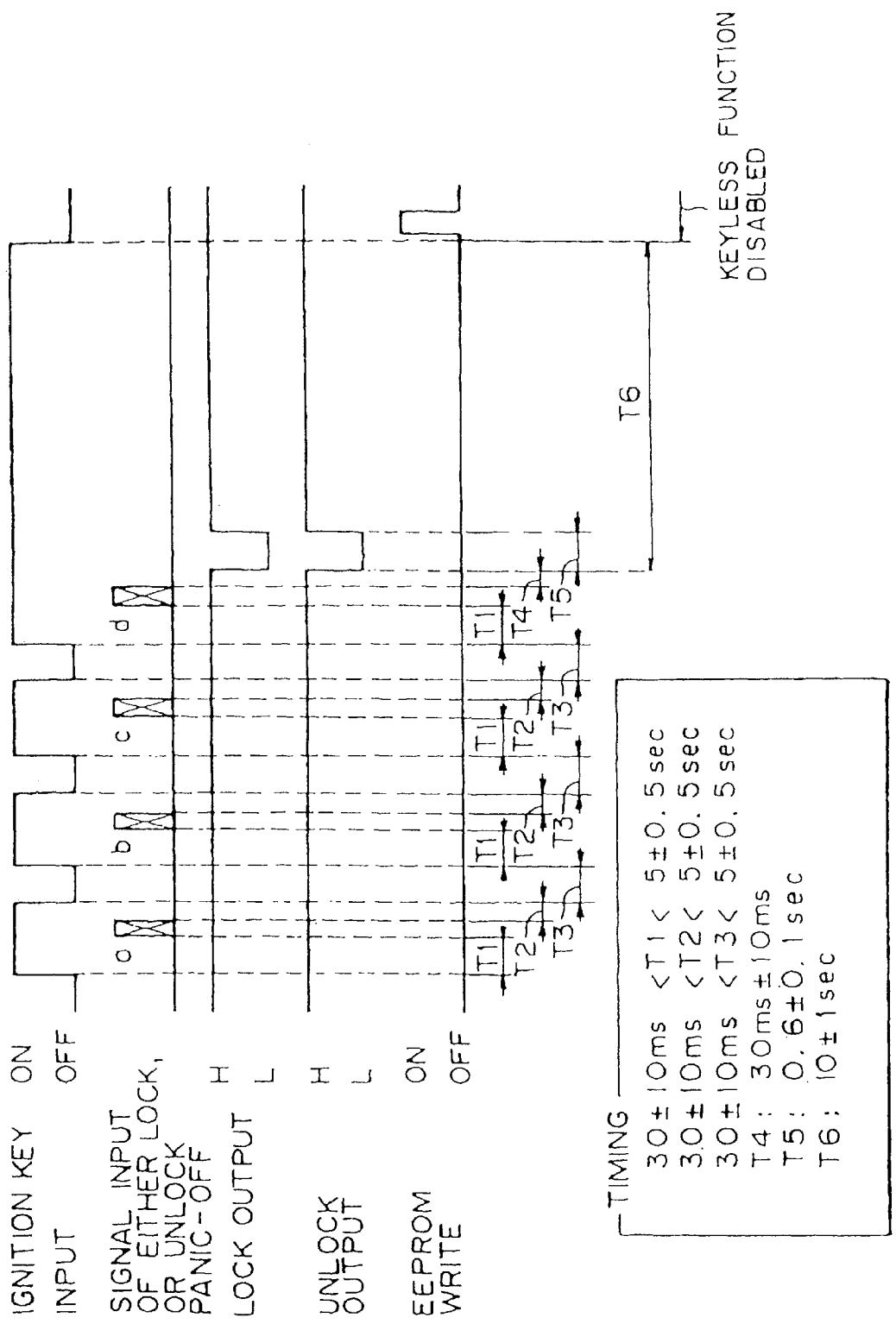
FIG. 4 is a timing chart associated with the operation of setting the operation mode of the signal processing unit of the receiver shown in FIG. 2 to a control signal disable mode.
Figure 5:
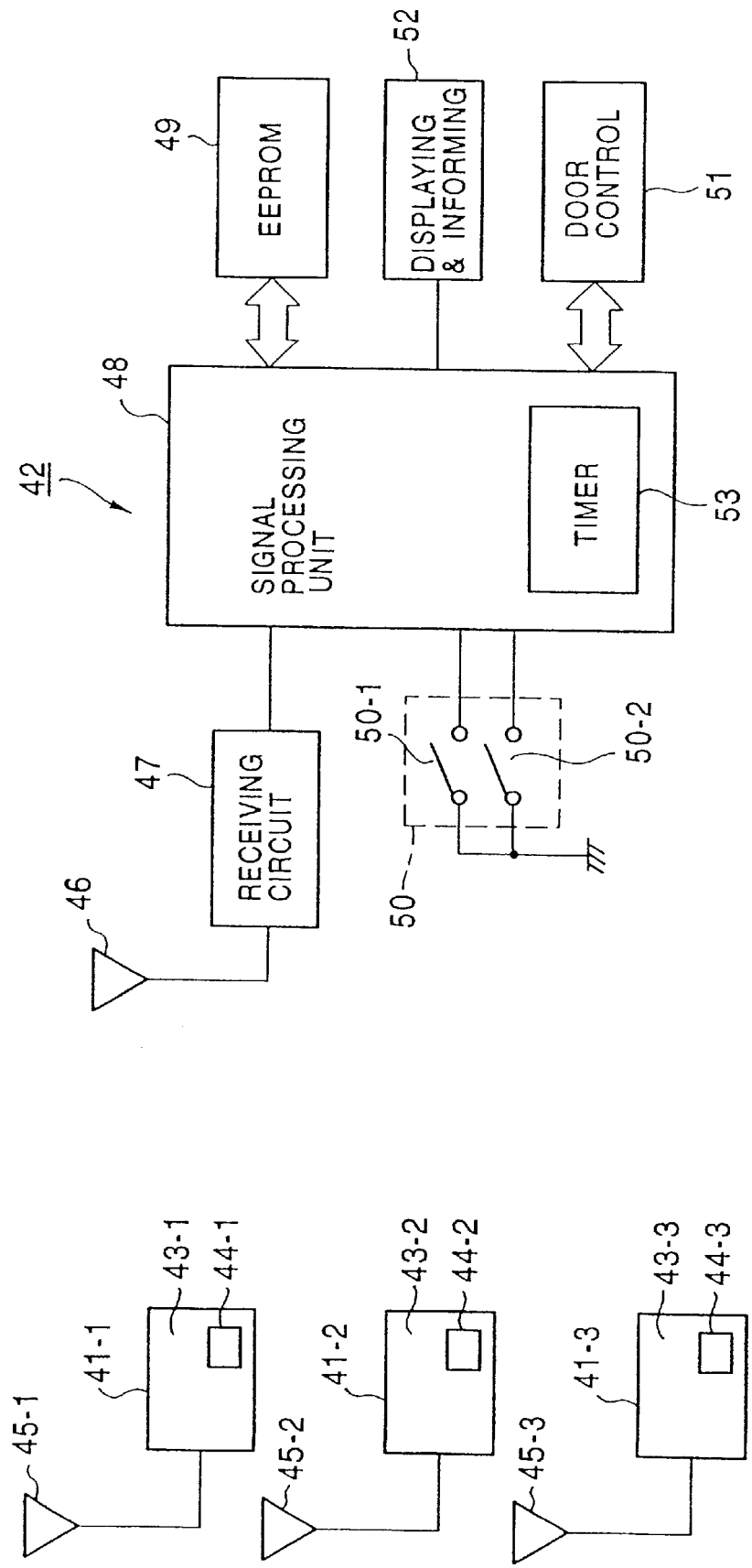
FIG. 5 is a simplified block diagram illustrating an example of a conventional keyless entry system.

FIG. 4 illustrates an example of the procedure of setting the operation mode to the control signal disable mode associated with the signal processing unit 14 in the keyless entry system according to the present embodiment.

Referring to FIG. 4, the procedure of switching the operation mode of the keyless entry system of the present embodiment from the normal mode to the control signal disable mode is described below.

As shown in FIG. 4, of the operation procedure, steps of switching the operation mode of the signal processing unit 14 from the normal mode to the mode setting state is performed in exactly the same manner as in the operation procedure described above. That is, the first, second, third, and fourth operation cycles are sequentially performed thereby setting the operation of the signal processing unit 14 into the mode setting state.

After the operation mode of the signal processing unit 14 has been set into the mode setting state, if a transmission code including an identification code is not transmitted unlike the process in which an identification code is written into the identification code memory 15, that is, if only an ON signal from the ignition key 21 is supplied to the mode controller 18 and no other signal is supplied to it for a time T6 after the start of the mode setting state, or the ignition key 21 is turned off and an OFF signal is supplied to the mode controller 13 within a time T6, then the mode controller 18 generates a control disable code to the control disable code memory 19 thereby writing the control disable code into the control disable code memory 19 and thus setting the operation mode of the signal processing unit 14 to the control signal disable mode.

Also in the above sequence of operation steps, the times T1, T2, and T3 are each selected to 30±10 msec to 5±0.5 sec, T4 is selected to 30±10 msec, T5 is selected to 0.6±0.1 sec, and T6 is selected to 10±1 sec. In the control signal disable mode, the identification codes stored in the EEPROM serving as the identification code memory 15 are still held therein.

Even when the signal processing unit 14 is in the control signal disable mode, the numerical (variable) code contained in the transmission code is updated each time a transmission code is transmitted from the remote control transmitter 1, and thus the numerical (variable) code stored in the variable code memory 16 which is compared with the numerical (variable) code contained in the transmission code is also updated each time the receiver 2 receives a transmission code. This is for the following reason. When the signal processing unit 14 is in the control signal disable mode, if a plurality of remote control transmitters 1 still remain in use by different users after some remote control transmitter 1 is lost, and if some user of the remote control transmitter 1, who does not know the fact that the signal processing unit 14 is in the control signal disable mode, operates his/her remote control transmitter 1 a plurality of times, only the numerical (variable) code of his/her remote control transmitter 1 is updated in response to the operation. If the operation of updating the numerical (variable) codes stored in the variable code memory 16 in the receiver 2 is disabled when the signal processing unit 14 is in the control signal disable mode, the difference between the numerical (variable) code in the remote control transmitter 1 and the numerical (variable) code stored in the variable code memory 16 in the receiver 2 will exceed the allowable limit. In such a situation, if the operation mode of the signal processing unit 14 returns to the normal mode, the transmission code from that remote control transmitter 1 will not be accepted.

In the present embodiment, when the signal processing unit 14 is in the control signal disable mode, one method of returning its operation mode to the normal mode is as follows. First, the operation procedure shown in FIG. 4 is performed to set the signal processing unit 14 into the control signal disable mode. If a time T6 has elapsed after the operation mode of the signal processing unit 14 was switched to the identification code writing mode, the mode controller 18 supplies a control disable code erasing code to the control disable code memory 19 thereby erasing the control disable code stored in the control disable code memory 19 thus returning the operation mode of the signal processing unit 14 from the control signal disable mode to the normal mode. This method makes it possible to restart the use of a lost remote control transmitter when it is found, without having to register a new identification code for it.

Another method of returning the operation mode to the normal mode will be described below. After the operation mode of the signal processing unit 14 is set to the identification code writing mode, one or more new identification codes are written into the identification code memory 15. After completion of the identification code writing mode, the operation mode of the signal processing unit 14 is returned to the normal mode in the manner described above. This method is used to reregister the identification codes for remote control transmitters which still remain when some remote control transmitter is lost and it cannot be found. In a preferable embodiment, the operation mode is allowed to return to the normal mode only when all identification codes currently stored in the identification code memory 15 are rewritten. This ensures that a lost remote control transmitter is prevented from being used by an unauthorized user.

The operation of the signal processing unit 14 of the communication system according to the present invention has been described above for each operation mode. Now, the overall operation of the communication system according to the present invention will be described below with reference to the flow charts shown in FIGS. 6–10.

In the above description, it is assumed that the signal processing unit 14 reads an identification code directly from the EEPROM. In contrast, in these flow charts, the identification code read from the EEPROM is temporarily stored in a memory area of a RAM, and then the identification code is read from the RAM to the signal processing unit 14. For convenience, the description about the comparison process of variable codes will be given in a simplified fashion.

In the flow charts, RAM-X and RAM-Y denote receiving buffers provided in the RAM, for temporarily storing a received transmission code. A transmission code which has been received first is stored in RAM-X, and a transmission code received next is stored in RAM-Y. Transmission codes received after that are stored in the receiving buffers in the cyclic order from RAM-X to RAM-Y wherein the old transmission codes stored in the buffers are replaced by new transmission codes. RAM-Z1, RAM-Z2, and RAM-Z3 denote memory areas of the RAM for temporarily storing the identification codes read from the EEPROM. RAM-Q denotes a memory area of the RAM for temporarily storing a control disable code read from the control disable code memory area of the EEPROM.

Figure 6:
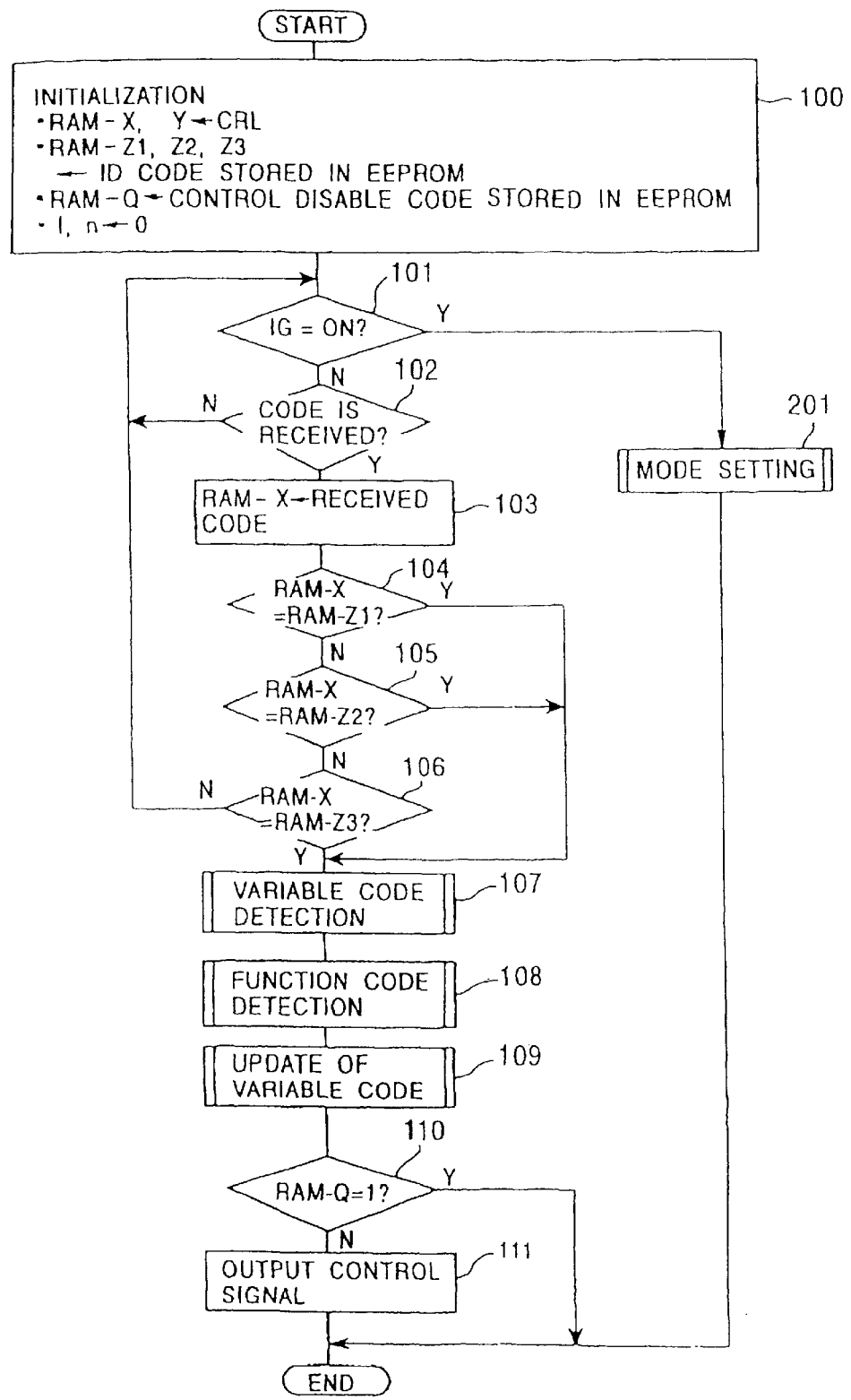
FIG. 6 is a flow chart illustrating a part of the overall operation process of a communication system according to the present invention.

In the first step 100, as shown in FIG. 6, initialization is performed. In this initialization step, RAM-X and RAM-Y in the RAM are cleared, the identification codes stored in the identification code memory area 15 of the EEPROM are written into RAM-Z1, RAM-Z2, and RAM-Z3, respectively, and the control disable code stored in the control disable code memory area 19 in the EEPROM is written into RAM-Q. A control disable code having a value of 1 represents the control disable mode, and a control disable code having a value of 0 represents the normal mode. I denotes a flag whose value is changed cyclically between 0 and 1 in response to each reception of an ON signal from the ignition key 21, and n denotes a counter whose value is incremented each time an identical signal is received. Both I and n are reset to 0 in this initialization step.

In step 101, it is checked whether an ON signal from the ignition key 21 is received. If the conclusion of the check is positive, the process goes to step 201 to perform "mode setting". If the conclusion of the check in step 101 is negative, the process goes to steps 102–111 in which a routine of processing a received code is performed. In the received code processing routine, the identification code contained in the received code is compared with the contents of RAM-Z1, RAM-Z2, and RAM-Z3. Furthermore, the variable code and function code contained in the received code are evaluated. If the above comparison and evaluation show that the received code satisfies predefined conditions, the variable code stored in the EEPROM is replaced by the variable code contained in the received code. Finally, a control signal is output. However, if it is concluded in step 110 that the control disable code stored in RAM-Q is equal to 1, that is, the operation is in the control signal disable mode, then the routine is terminated without outputting any control signal.

Figure 7:
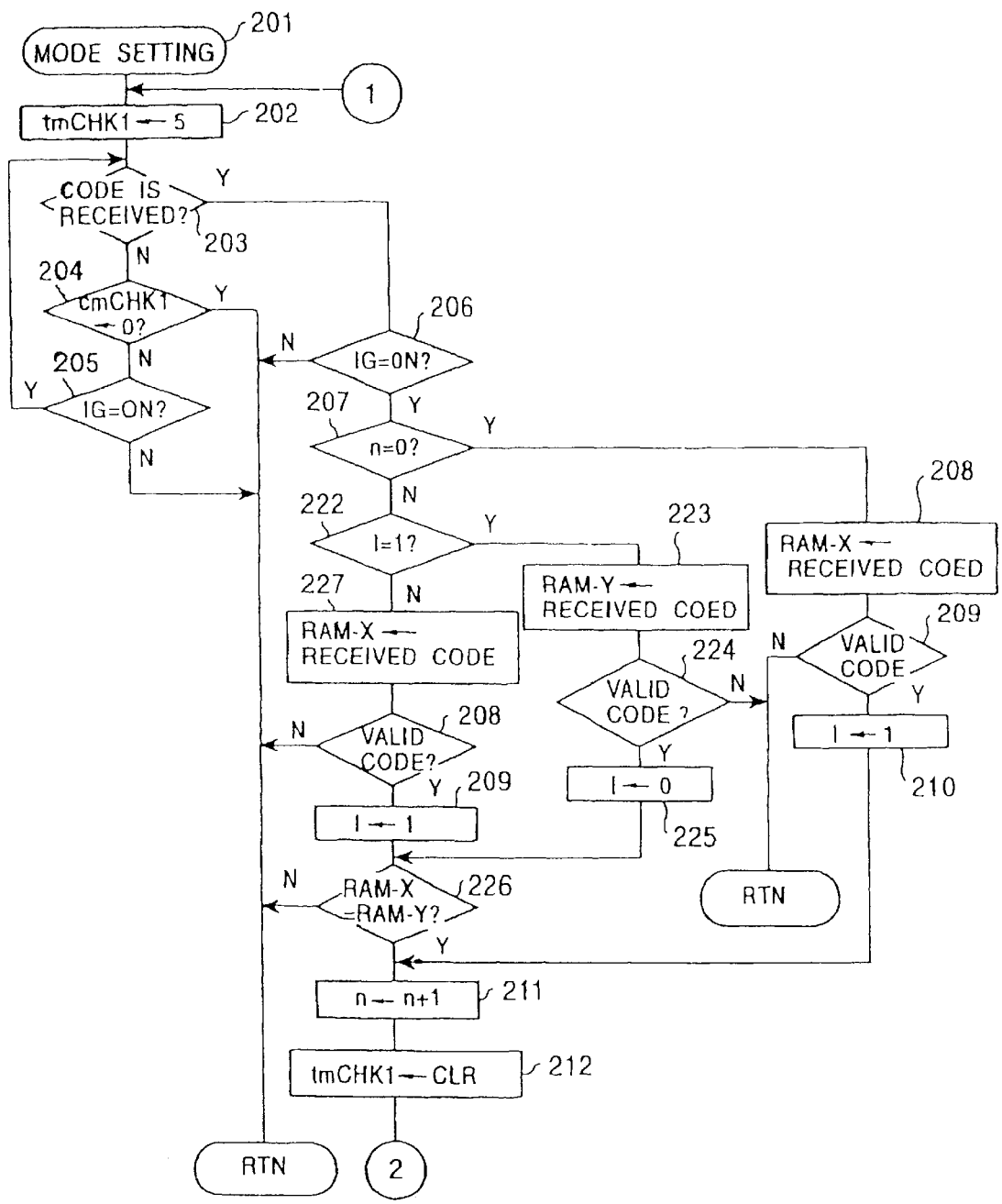
FIG. 7 is a flow chart illustrating another part of the overall operation process of the communication system according to the present invention.
Figure 8:
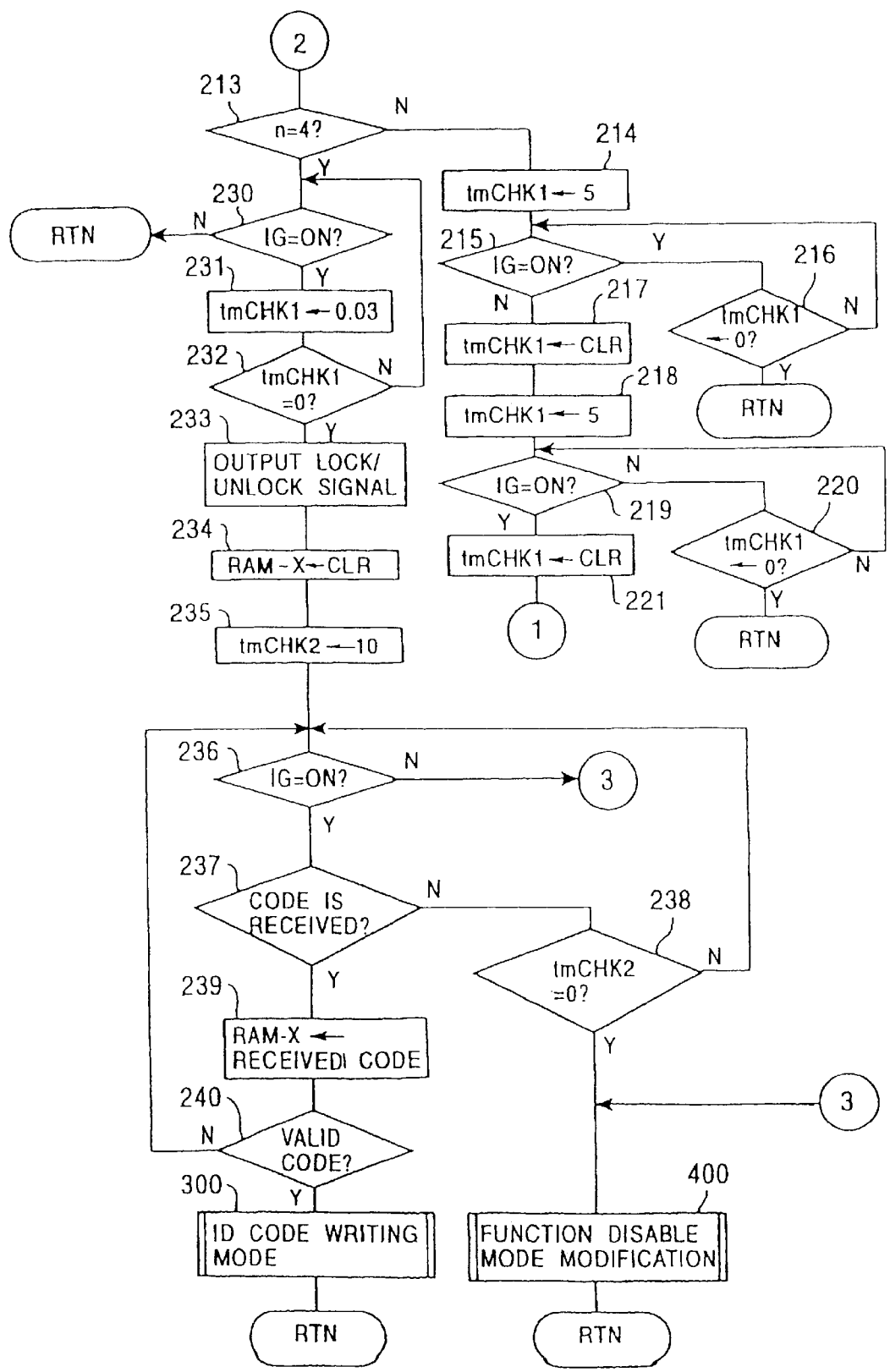
FIG. 8 is a flow chart illustrating still another part of the overall operation process of the communication system according to the present invention.

In the mode setting routine which starts at step 201, as shown in FIGS. 7 and 8, the signal processing unit is set into the mode setting state in which it is allowed to switch the operation mode into the identification code writing mode or into the control signal disable mode, or release the control signal disable mode. After the signal processing unit is set into the mode setting state, the operation mode is switched depending on the particular condition. In steps 202–230 of the mode setting routine, it is checked whether ON/OFF signals from the ignition key 21 and the codes are received in a valid manner. In step 233, a door lock/unlock control signal is output. After that, the timer tmCHK2 is set to 10 sec (corresponding to T6 shown in FIG. 3). Then the routine enters a mode setting state in which the routine monitors the reception of a signal from the ignition key 21 and also the reception of a code. In this routine, it is checked whether the received code is valid or not by evaluating the total bit length of the transmission code, the fixed code described earlier, etc. Furthermore, it is checked whether the timing of reception of the signal from the ignition key 21 and also the timing of reception of the code are within allowable periods, using a timer tmCHK1. It is also checked whether codes received successively are identical or not. This checking is performed by storing each received code into a proper one of either RAM-X or RAM-Y, updating the flag I each time a code is received, and comparing the contents of RAM-X and RAM-Y. The number of receptions of codes is counted by the counter n. In the mode setting state, the routine is connected to either a routine in the identification code writing mode or a routine of switching the control signal disable mode depending on the signal from the ignition key 21 and also depending on whether a transmission code is received or not.

Figure 9:
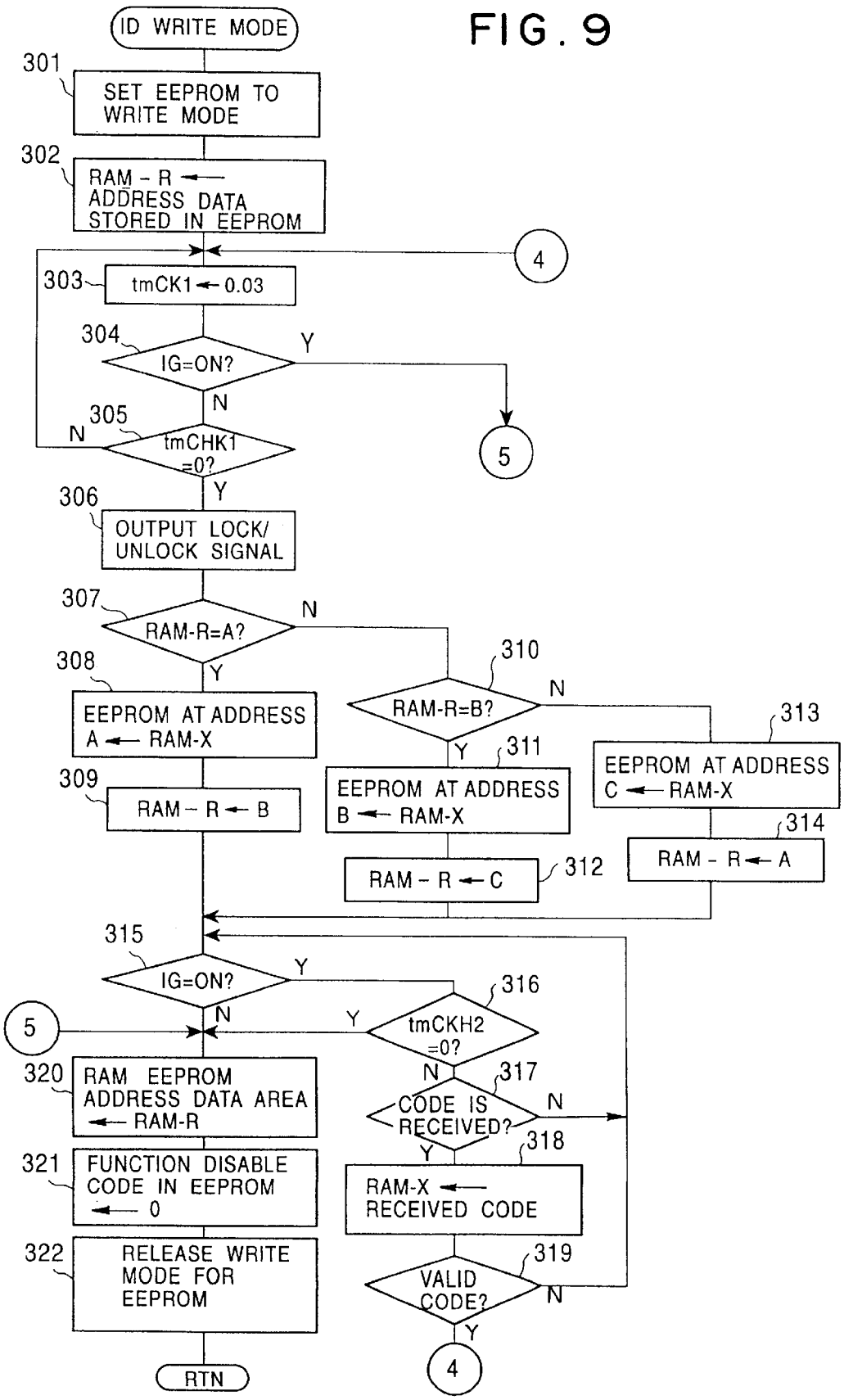
FIG. 9 is a flow chart illustrating still another part of the overall operation process of the communication system according to the present invention.

In FIGS. 8 and 9, the code writing procedure in the identification code writing mode is performed in steps starting at 300. When the operation is in the mode setting state, if a transmission code is received, the identification code contained in the received transmission code is stored in the identification code memory area 15 in the EEPROM. The timer tmCHK1 watches the elapse of time associated with T4 and T5 shown in FIG. 3. RAM-R is used to store data specifying the addresses of the EEPROM at which a plurality of identification codes are newly stored. At the final step 321 of the routine, the control disable code stored in the control disable code memory area 19 in the EEPROM is changed to 0 thereby releasing the operation mode from the control signal disable mode to the normal mode.

In step 236 in the mode setting state, if an OFF signal is generated from the ignition key 21, or if expiration of 10 sec occurs in the timer tmCHK2, the process goes to step 400 to perform switching of the control signal disable mode.

Figure 10:
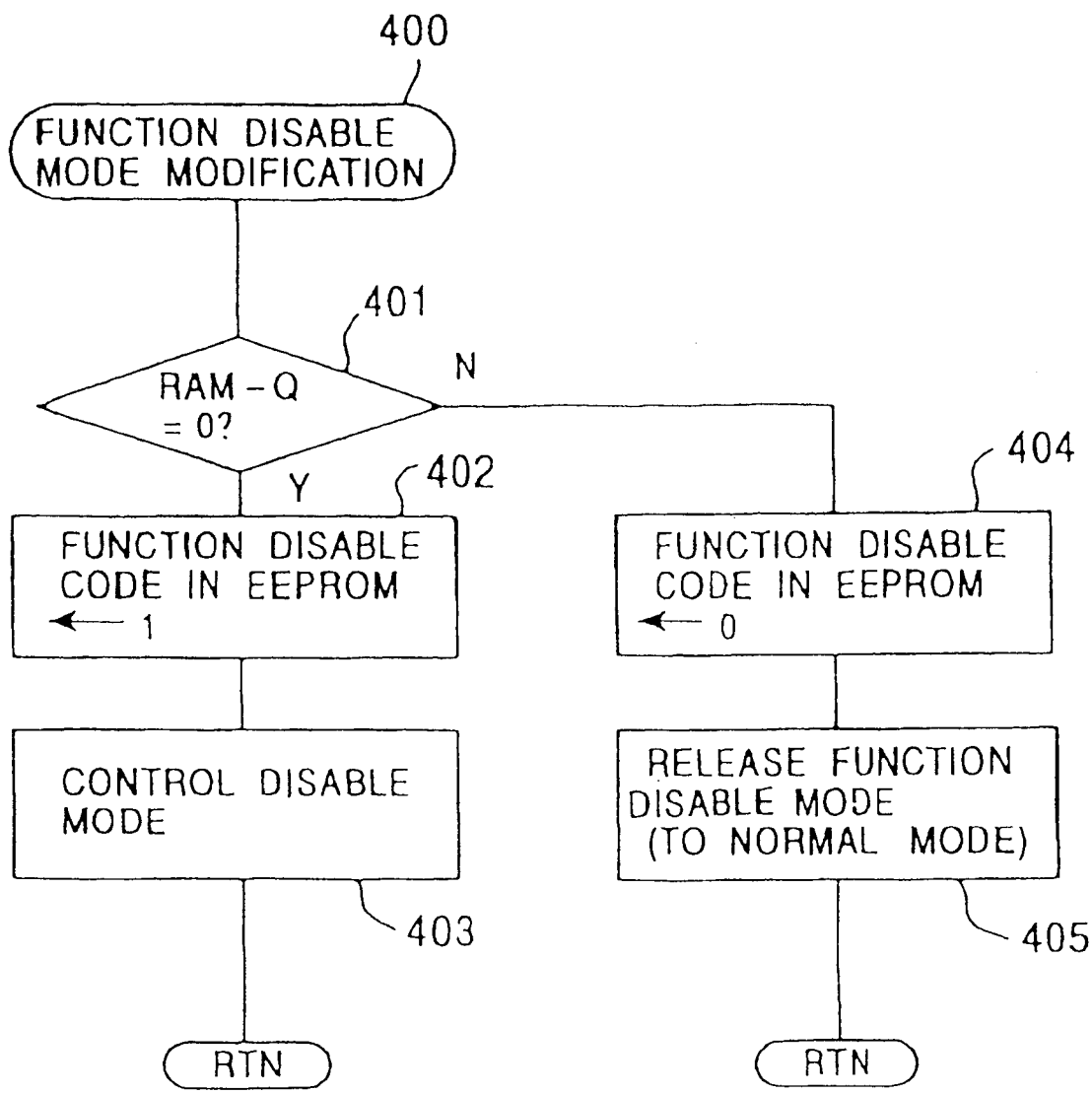
FIG. 10 is a flow chart illustrating still another part of the overall operation process of the communication system according to the present invention.

Referring to FIGS. 8 and 10, the switching of the control signal disable mode will be described below. In step 401, it is checked whether the control signal disable code stored in RAM-Q serving as the control signal disable code memory area 19 of the EEPROM is equal to 0 or 1. In step 402 or 405, the control signal disable code is changed to a value opposite to the current value. That is, in the present embodiment, if no transmission code is received within an allowable period in the same procedure, the control signal disable code mode is set or released.

In the embodiment described above, the control signal disable mode is switched to the normal mode by the same process as that performed when the normal mode is switched to the control signal disable mode. In this method, the time T6 is set to a long enough value so that an identification code can be written without encountering a timeout. However, if the remote control transmitter 1 is incorrectly operated and a transmission code is transmitted before expiration of time T6, an unwanted transition to the identification code writing mode can occur. To avoid the above problem, the switching between the control signal disable mode and the normal mode may be performed as follows.

When the operation is in the control signal disable mode, if the routine enters a mode setting state, time T6 and time T1 are set such that T1 is shorter than T6. If an identification code is received within a period from time T1 to T6, the operation mode is switched from the control signal disable mode to the normal mode without writing the received identification code. This avoids the problem described above.

In the specific embodiment described above, when the operation mode of the signal processing unit 14 is switched from the normal mode to the identification code writing mode, or from the normal mode to the control signal disable mode, or from the control signal disable mode to the normal mode, the same operation cycle is repeated four times in the first through fourth operation cycles. However, the number of operation cycles is not limited to four, and the operation cycle may be performed three times or five times.

In the above embodiment described above, the operation mode of the signal processing unit 14 is switched depending on the combination of the ON signal from the ignition key 21 and switching information representing either lock, unlock, or panic-off switching. However, in the present invention, the combination is not limited to the above example. For example, an ON signal from the ignition key 21 and a signal from a power window switch may be combined into switching information.

If the switching information in the form of such the combination is further combined with the switching information from a remote control transmitter 1, it becomes possible to allow only an authorized user of a remote control transmitter 1 registered in the receiver 2 to switch the operation mode of the signal processing unit 14 to the control signal disable mode.

Although in the specific embodiment described above it is assumed that the control signal disable mode is applied to all parts to be controlled, the control signal disable mode may also be applied to some particular parts to be controlled. For example, the control signal disable mode may be applied to the door locking/unlocking operation while it is not applied to the security. Or the control signal may be disabled only for automatic locking and beep alarming.

Furthermore, although in the above embodiment, the communication system is assumed to be a keyless entry system, the communication system of the present invention is not limited to the keyless entry system. The invention may be applied to any type of communication system similar to the keyless entry system.

According to the embodiment of the invention, as described above, when any one of the plurality of remote control transmitters 1 is lost, it is possible to switch the operation mode of the signal processing unit 14 of the receiver 2 from the normal mode to the control signal disable mode thereby disabling use of the lost remote control transmitter 1 and thus preventing the lost remote control transmitter 1 from being used for a bad purpose. Furthermore, it is possible to prevent an unauthorized user from mischievously switching the operation mode to the control signal disable mode.

Furthermore, the above embodiment of the invention allows a user to easily switch the operation mode of the signal processing unit 14 from the normal mode to the identification code writing mode, from the normal mode to the control signal disable mode, or from the control signal disable mode to the normal mode simply by performing almost the same operation procedure with a slight difference in an additional operation step depending on the operation mode. Thus, the user can easily memorize the operation procedure.

Furthermore, in the above embodiment of the invention, when the lost remote control transmitter 1 is found, it is possible to easily rewrite the identification code assigned to the remote control transmitter 1 into the identification code memory 15 of the receiver 2 by means of performing a simple operation procedure.

Furthermore, in the above embodiment of the invention, when the operation mode of the signal processing unit 14 is returned from the control signal disable mode to the normal mode, if a new identification code is written into the identification code memory 15, the security of the communication system is improved.

As can be seen from the above description, the present invention has many advantages. When one of the plurality of transmitters is lost, it is possible to switch the operation mode of the signal processing unit of the receiver from the normal mode to the control signal disable mode so that use of the lost transmitter is disabled thereby preventing the lost transmitter from being used for a bad purpose. Furthermore, it is possible to prevent an unauthorized user from mischievously switching the operation mode to the control signal disable mode.

Furthermore, the present invention makes it possible for a user to easily switch the operation mode of the signal processing unit from the normal mode to the identification code writing mode, from the normal mode to the control signal disable mode, or from the control signal disable mode to the normal mode by performing almost the same operation procedure with a slight difference in an additional operation step depending on the operation mode. Thus, the user can easily memorize the operation procedure required to perform desired setting.

Furthermore, in the present invention, when the lost transmitter is found somewhere, it is possible to easily switch the operation mode of the signal processing unit of the receiver from the normal mode to the identification code writing mode so as to rewrite the identification code of the transmitter found into the memory of the receiver.

What is claimed is:

1. A communication system comprising:
   a transmitter for transmitting a transmission code containing at least a first identification code uniquely assigned to said transmitter; and
   a receiver for receiving the transmission code, the receiver comprising:
      a memory for storing a second identification code;
      a signal processing unit for comparing a received first identification code with the second identification code stored in said memory, and for transmitting a control signal to a part to be controlled if the first and second identification codes are identical to each other; and
      a mode controller for switching an operation mode of said signal processing unit from a normal mode, in which said control signal to said part is transmitted when the first and second identification codes are identical, to a control signal disable mode, in which said control signal to said part is not transmitted when the first and second identification codes are identical,
      wherein said transmission code includes a variable code, and said memory has a variable code storage area for storing said variable code wherein, when said first identification code and said second identification code are identical to each other, said signal processing unit compares the variable code in said transmission code with the variable code stored in said variable code storage area and delivers said control signal to said part to be controlled when a match is obtained between the variable codes within a predetermined range, wherein said processing unit updates the variable code in said variable code storage area with the received variable code at the same time as the delivery of said control signal, whereby the comparison between the variable codes and the update of the variable code of said transmission code and the update of the variable code stored in said variable code storage area is performed even in said control signal disable mode.

2. A communication system comprising:

a transmitter for transmitting a transmission code containing at least a first identification code uniquely assigned to said transmitter; and a receiver for receiving the transmission code, the receiver comprising:
- a memory for storing a second identification code;
- a signal processing unit having three operation modes: a normal mode, in which a control signal is transmitted to a part to be controlled if a received first identification code is identical to the second identification code stored in said memory, an identification code writing mode, in which said received first identification code is written as the second identification code into said memory, and a third operation mode, which is different from the normal mode and the identification code writing mode;
- wherein said signal processing unit includes a mode setter to automatically switch the operation mode from the normal mode to either the identification code writing mode or the third operation mode, which is different from the normal mode and the identification code writing mode, depending on whether a transmission code is received within a predetermined period of time after implementing a mode setting state by execution of a predetermined procedure.

3. The communication system of claim 2, wherein said third operation mode is a control signal disable mode in which said signal processing unit does not output a control signal to the part to be controlled.

4. The communication system of claim 3 wherein said predetermined procedure comprises a combination of operations associated with a previously received transmission code and information supplied from an outside source.

5. The communication system of claim 4, wherein said receiver includes a timer and said predetermined period of time is form when said timer starts at the end of said predetermined procedure to when said timer expires or a predetermined signal change occurs in said information supplied form the outside source.

6. The communication system of claim 3, wherein switching to and from said control signal disable mode are effected by a common operation procedure.

7. The communication system of claim 3, wherein said receiver includes a timer and said predetermined period of time is from when said timer starts at the end of said predetermined procedure to when said timer expires or a predetermined signal change occurs in said information supplied from the outside source.

8. The communication system of claim 2, wherein said predetermined procedure comprises a particular combination of operations associated with a previously received transmission code and information supplied from an outside source.

9. The communication system of claim 8, wherein said communication system is incorporated into a vehicle, and wherein said information supplied from the outside source is information generated by operating an ignition key of the vehicle.

10. The communication system of claim 8, wherein said receiver includes a timer and said predetermined period of time is from when said timer starts at the end of said predetermined procedure to when said timer expires or a predetermined signal change occurs in said information supplied from the outside source.

11. The communication system of claim 2, wherein said receiver includes a timer and said predetermined period of time is from when said timer starts at the end of said predetermined procedure to when said timer expires or a predetermined signal change occurs in said information supplied from the outside source.

12. A communication system according to claim 2, wherein the signal processing unit treats identical operation signals from the transmitter differently dependent on the mode into which the signal processing unit is switched when receiving the identical operation signal from the transmitter.

13. A communication system according to claim 2, wherein the transmission code includes a variable code, and the memory has a variable code storage area for storing the variable code wherein, when the first identification code and the second identification code are identical to each other, the signal processing unit compares the variable code in the transmission code with the variable code stored in the variable code storage area and delivers the control signal to the part to be controlled when a match is obtained between the variable codes within a predetermined range, wherein the processing unit updates the variable code in the variable code storage area with the received variable code at the same time as the delivery of the control signal, whereby the comparison between the variable codes and the update of the variable code of the transmission code and the update of the variable code stored in the variable code storage area is performed independent of the mode of the processing unit.

14. A communication system comprising:

a transmitter for transmitting a transmission code containing at least an identification code uniquely assigned to said transmitter; and a receiver for receiving the transmission code, the receiver comprising:
- a receiving unit for receiving the transmission code transmitted from said transmitter;
- a memory switchable between a reading mode for enabling reading of the content therefrom and a writing mode for enabling writing of the received identification code therein; and
- a signal processing unit for extracting the identification code from said transmission code and comparing the extracted identification code with the identification code stored in said memory, said processing unit having a normal mode in which, when the compared identification codes are identical, a control signal is transmitted to a part to be controlled and having also an identification code writing mode in which the received identification code is written into said memory,
- wherein said signal processing unit comprises a mode setter to select and set the operation modes automatically through execution of an identical procedure, such that, if said transmission code is received within a predetermined period of time, said memory is set to said writing mode to enable the received identification code to be written therein, whereas, if said transmission code is not received within said predetermined period of time, said memory is maintained in the reading mode to permit reading therefrom, said mode setter also being operable to automatically and selectively set said signal processing unit to either a control signal disable mode in which, when the compared identification codes are identical, said control signal is not transmitted to said part or to said normal mode, depending on the operation mode from which the mode switching is performed.

15. The communication system of claim 14, wherein said signal processing unit is so arranged as to be automatically set by said mode setter to said control signal disable mode when the mode switching is performed from said normal mode.

16. A communication system according to claim 14, wherein the signal processing unit treats identical operation signals from the transmitter differently dependent on the mode into which the signal processing unit is switched when receiving the identical operation signal from the transmitter.

17. A communication system according to claim 14, wherein the transmission code includes a variable code, and the memory has a variable code storage area for storing the variable code wherein, when the first identification code and the second identification code are identical to each other, the signal processing unit compares the variable code in the transmission code with the variable code stored in the variable code storage area and delivers the control signal to the part to be controlled when a match is obtained between the variable codes within a predetermined range, wherein the processing unit updates the variable code in the variable code storage area with the received variable code at the same time as the delivery of the control signal, whereby the comparison between the variable codes and the update of the variable code of the transmission code and the update of the variable code stored in the variable code storage area is performed even in the control signal disable mode.

18. A communication system comprising:
  a transmitter for transmitting a transmission code containing at least a first identification code uniquely assigned to said transmitter; and
  a receiver for receiving the transmission code, the receiver comprising:
    a memory for storing a second identification code;
    a signal processing unit for comparing a received first identification code with the second identification code stored in said memory, and for transmitting a control signal to a part to be controlled if the first and second identification codes are identical to each other; and
    a mode controller for switching an operation mode of said signal processing unit from a normal mode, in which said control signal to said part is transmitted when the first and second identification codes are identical, to a control signal disable mode, in which said control signal to said part is not transmitted when the first and second identification codes are identical, the switching of the operation mode to the control signal disable mode determined by a predetermined combination of the received code and outside information supplied from an outside source.

19. A communication system according to claim 18, wherein the transmission code includes a variable code, and the memory has a variable code storage area for storing the variable code wherein, when the first identification code and the second identification code are identical to each other, the signal processing unit compares the variable code in the transmission code with the variable code stored in the variable code storage area and delivers the control signal to the part to be controlled when a match is obtained between the variable codes within a predetermined range, wherein the processing unit updates the variable code in the variable code storage area with the received variable code at the same time as the delivery of the control signal, whereby the comparison between the variable codes and the update of the variable code of the transmission code and the update of the variable code stored in the variable code storage area is performed even in the control signal disable mode.

20. A communication system according to claim 18, wherein the signal processing unit treats identical operation signals from the transmitter differently dependent on the mode into which the signal processing unit is switched when receiving the identical operation signal from the transmitter.

21. A communication system according to claim 18, wherein the outside information is supplied by operation of vehicle equipment.

22. A communication system according to claim 18, wherein the combination comprises repetition of a cycle of the transmission code and the outside information.

23. A communication system comprising:
  a transmitter for transmitting a transmission code containing at least an identification code uniquely assigned to said transmitter; and
  a receiver for receiving the transmission code, the receiver comprising:
    a receiving unit for receiving the transmission code transmitted from said transmitter;
    a memory for storing a received identification code; and
    a signal processing unit for extracting the identification code from said transmission code and comparing the extracted identification code with the identification code stored in said memory, said signal processing unit including;
      a normal mode in which, when the compared identification codes are identical, a control signal is transmitted to a part to be controlled;
      an identification code writing mode in which the received identification code is written in said memory; and
      a control signal disable mode in which, when the compared identification codes are identical, a control signal is not transmitted to said part,
      wherein said signal processing unit comprises a mode setter to select and set an operation mode automatically through execution of an identical procedure, such that, when the switching of the operation mode is executed from said normal mode, the normal mode is switched to said identification code writing mode if said transmission code is received within a predetermined period of time, whereas if said transmission code is not received within said predetermined period of time, said normal mode is switched to said control signal disable mode, and, when the switching of the operation mode is executed from said control signal disable mode, the control signal disable mode is switched to said identification code writing mode if said transmission code is received within said predetermined period of time, whereas if said transmission code is not received within said predetermined period of time, said control signal disable mode is switched to the normal mode.

24. A communication system according to claim 23, wherein the transmission code includes a variable code, and the memory has a variable code storage area for storing the variable code wherein, when the first identification code and the second identification code are identical to each other, the signal processing unit compares the variable code in the transmission code with the variable code stored in the variable code storage area and delivers the control signal to the part to be controlled when a match is obtained between the variable codes within a predetermined range, wherein the processing unit updates the variable code in the variable code storage area with the received variable code at the same time as the delivery of the control signal, whereby the comparison between the variable codes and the update of the variable code of the transmission code and the update of the variable code stored in the variable code storage area is performed even in the control signal disable mode.

25. A communication system according to claim 23, wherein the signal processing unit treats identical operation signals from the transmitter differently dependent on the mode into which the signal processing unit is switched when receiving the identical operation signal from the transmitter.

* * * * *

UNITED STATES PATENT AND TRADEMARK OFFICE
CERTIFICATE OF CORRECTION

PATENT NO.    : 6,538,558 B2                                    Page 1 of 1
DATED         : March 25, 2003
INVENTOR(S)   : Tatsumi Sakazume et al.

It is certified that error appears in the above-identified patent and that said Letters Patent is hereby corrected as shown below:

<u>Column 17,</u>
Line 48, delete "form" and substitute -- from -- in its place.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,538,558 B2
DATED        : March 25, 2003
INVENTOR(S)  : Tatsumi Sakazume et al.

It is certified that error appears in the above-identified patent and that said Letters Patent is hereby corrected as shown below:

<u>Title page,</u>
Item [73], Assignee, after "Tokyo (JP)" insert -- Honda Motor Co., Ltd., Tokyo (JP) --.

<u>Column 17,</u>
Line 48, delete "form" and substitute -- from -- in its place.

Signed and Sealed this

Twenty-ninth Day of June, 2004

JON W. DUDAS
*Acting Director of the United States Patent and Trademark Office*